(12) United States Patent
Martinka et al.

(10) Patent No.: US 6,728,692 B1
(45) Date of Patent: Apr. 27, 2004

(54) APPARATUS FOR A MULTI-MODAL ONTOLOGY ENGINE

(75) Inventors: Joseph J Martinka, Sunnyvale, CA (US); Adrian Krug, Langenfeld (DE); Patricia Collins, Mountain View, CA (US); George H. Forman, Port Orchard, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/470,848

(22) Filed: Dec. 23, 1999

(51) Int. Cl.$^7$ ............................................. G06F 17/00
(52) U.S. Cl. ............................. 706/45; 706/46; 706/47
(58) Field of Search ............................. 706/45, 46, 47; 707/500

(56) References Cited

U.S. PATENT DOCUMENTS 5,797,135 A    8/1998  Whalen et al. ................ 706/53

OTHER PUBLICATIONS

U.S. Application of Joseph Martinka, et al. entitled Method and Apparatus for a Compositional Decision Support Reasoning System Ser. No. 09/472,389 filed on the same date as the present application.

Artificial Intelligence 79 (1995) 293–326; Task Modeling With Reuseable Problem–Solving Methods of Eriksson, et al.

Data & Knowledge Engineering 25 (1998) 161–167 Knowledge Engineering: Principles and Methods of Studer, et al.

Knowledge Management, Using AI in Knowledge Management: Knowledge Bases and Ontologies of Daniel E. O'Leary, University of Southern California; May/Jun. 1998.

The Knowledge of Engineering Review, vol. 12:2, 1997, 181–207; Integrating Multiple Problem Solvers in Knowledge Based Systems of Christodoulou, et al.

International Journal of Intellegent Systems, vol. 8, 51–70 (1993) Modeling Practical Reasoning of Brian R. Gaines.

The Knowledge Modeling Group at Stanford Mecical Informatics; web page http://smi–web.stanford.edu/projects/prot–nt/ PROTEGE/WIN, no date.

The Knowledge Engineering Review, vol. 13:1, 1998, 5–29 Knowledge Level Modelling: Concepts and Terminology of Mike Uschold.

AdvantageKBS from Logica Corporation web sites http://www.akbs.com and http://www.logica.com, no date.

The Knowledge Engineering Review, vol. 12:4, 1997, 185–194, Modeling and Using Context by Patrick Brezillon and Marcos Cavalcanti.

*Primary Examiner*—Thomas Black
*Assistant Examiner*—Joseph P Hirl

(57) ABSTRACT

An apparatus for a multi-modal reasoning ontology engine comprising a data structure on computer readable media, where the data structures has a knowledge representation fact base of knowledge objects called tasks and results, where each result corresponds to one task to form a unique task-result pair, and a premise maintenance system of truth objects that can be reused called premises and conclusions.

20 Claims, 4 Drawing Sheets

APPARATUS FOR A MULTI-MODAL ONTOLOGY ENGINE

This invention is related to the copending U.S. Application of Joseph Martinka, et. al. entitled "METHOD AND APPARATUS FOR A COMPOSITIONAL DECISION SUPPORT REASONING SYSTEM", Ser. No. 09/472,389 filed on the same date as the present application, and hereby incorporates by reference all that is disclosed therein.

FIELD OF THE INVENTION

This invention pertains to the field of artificial intelligence, and more particularly, to an apparatus for an ontology engine that is usable by any reasoning system that has requirements for obtaining an evaluation of questions.

BACKGROUND OF THE INVENTION

For many organizations, their most valuable asset is their knowledge. More and more companies are embracing knowledge-based system technology as a means of putting the right knowledge in the hands of the right people at the right time. Intelligent electronic manuals, internal help desks, customer support hotlines, call avoidance troubleshooting software, pre-sales assessment, configuration guides, and proactive system management are some of the ways that the emerging field of computer aided decision support allows people to perform critical tasks and make key decisions with the skill of the leading experts, but without the labor costs of employing experts in delivering the support services.

Generally, computer-assisted solutions entail the employment of a decision support system, or a system that employs a knowledge representation paradigm to determine a solution to a problem. A knowledge representation paradigm comprises two components: a knowledge representation fact base and a reasoning system. A knowledge representation fact base is the means by which an expert's knowledge is encoded into a knowledge base, or a repository of information needed to solve a problem. A knowledge representation fact base can be thought of as comprising a number of related components called knowledge objects, where each object exists in a specific relationship to other objects in the knowledge representation fact base. Objects in a knowledge representation fact base represent the different components into which actual facts in the real world can be remembered and used. The specific terminology and definitions for concepts used in a given knowledge representation fact base are referred to as the knowledge representation paradigm's ontology: the terms knowledge representation fact base and ontology are often used interchangeably.

A reasoning system is the logic underlying a decision support system. A reasoning system of a decision support system is the logic component of the decision support system, as opposed to the knowledge repository component. A reasoning system is the mechanism that uses a knowledge representation model to make inferences between objects in the knowledge representation fact base. During a decision support session, a knowledge representation paradigm is employed to find a solution to problem. A reasoning system of the knowledge representation paradigm invokes an algorithm using its knowledge representation model to operate on knowledge in the system's knowledge representation fact base. A knowledge representation model can be a tree, or a graph, for example. Oftentimes, the terms knowledge representation paradigm and reasoning system are used synonymously. In large part, this is because in current systems, a knowledge representation fact base is inseparably part of a corresponding reasoning system: a knowledge representation fact base has semantics that are usually closely tied to a reasoning system algorithms.

Examples of existing knowledge representation paradigms include basic text, decision trees, decision graphs, case-bases, default logic, augmented fault, and Bayesian belief networks. A new decision support system using incremental conclusions is the subject of the aforementioned co-pending patent application. In a decision tree knowledge representation paradigm, for example, the knowledge representation fact base is composed of a number of question and answer knowledge objects, wherein knowledge is encoded into a knowledge base in the form of question and answer tests. The reasoning system of the decision tree knowledge representation paradigm comprises an algorithm of IF-THEN-ELSE statements that operate on the knowledge objects to create a tree model. The tree model encapsulates a series of decision flows that can be made using the question and answer objects in a decision support session. The logic of the IF-THEN-ELSE statements then dictate the relationship between these objects. Just as there are many different programming languages, each best suited for certain types of projects (e.g., FORTRAN for number crunching, Visual Basic for GUI development, C++ for object-oriented solutions), there are also many different ways for representing knowledge, some more appropriate for a given problem domain (i.e. subject matter) than others.

One example of a currently available decision support system is Hewlett-Packard's internal KnowledgeTrees system used for customer support. The knowledge representation paradigm in KnowledgeTrees uses a question-answer decision graph model to make inferences between question-answer objects in its fact base. In KnowledgeTrees, a question is directly associated with its answers. A question contains the answers within the same question data structure called the Q-node. Its inherent assumption is that the answers are mutually exclusive. The same Q-Node contains the control that links each answer to one subsequent question. There are several drawbacks to the KnowledgeTrees system. The simplicity of the Q-node knowledge representation limits the reusability of the questions and answers in other parts of the decision support system. This representation also excludes the ability for other reasoning systems to use its knowledge representation fact base.

ServiceWare's Knowledge Pak system is a symptom-case-question knowledge representation fact base. The Knowledge Pak system is described as being reasoning system neutral, but is conveniently designed for a case-based reasoning system. The logical control of the questions are tied to a case-based approach which tends to make alternative logic control of the decision support system difficult (i.e., in practice, it does not easily support the use of other reasoning systems). This system does not support non-exclusive answers to questions, nor are multiple conclusions possible during a decision support session. The Knowledge Pak of Questions, Solutions, Symptoms, and Cases are separate objects in Knowledge Pak, increasing its knowledge authoring complexity. Furthermore, there is no inherent persistent question support for reuse of discovered information.

Logica's AdvantageKbs is a decision support product that uses a symptom, cause, test, and solution ontology. Such a system requires maintenance from specially trained knowledge experts. While technically it offers good diagnostic troubleshooting, authoring by a wide variety of experts is not advised by the company due to its complexity. The ontology is not usable for other decision support needs such as configuration, analysis, nor provisioning. Their ability to automate the questions is also limited.

Inference's CBR Express is a decision support system based on a case-based knowledge representation paradigm that builds cases for diagnostic situations. The underlying knowledge representation consists of weighted questions that aim to distinguish a case or hypothesis from all others in the case base. The questions and answers, while exportable, are not shared with other case-bases. Cross domain references are impossible, as is the possibility of including all domains in a single casebase due to cognitive scalability issues. The CBR representation also includes answer "weights" which make the representation very difficult to maintain and understand.

This invention addresses some of the deficiencies of currently available knowledge representation paradigms. In existing paradigms, a knowledge representation fact base is inseparably part of a corresponding reasoning system as seen in the examples above. Proprietary knowledge representation can substantially limit the ability to reuse and leverage knowledge that could otherwise be used by other sources such as external data gathering knowledge agents. Current solutions do not provide the system supporting the ontology to maintain and reassert the dynamic knowledge learned during a decision support session. Furthermore, many problem domains, particularly complex ones, are best handled by a reasoning system that uses a combination of knowledge representation paradigms to optimize the quantity and quality of information, also called multi-modal reasoning capabilities. This is not possible, however, when the representation of knowledge is inseparably part of any one reasoning system. For example, a decision tree knowledge representation paradigm comprises a reasoning system that operates on questions and answers (objects) to create a tree hierarchy (model). These knowledge objects could not be used by a decision graph reasoning system, which operates and expects a series of like objects that can be placed in a decision graph model.

An intuitive and flexible knowledge authoring environment should be approachable by a wide variety of experts (also known as knowledge authors), to achieve comprehensive knowledge bases. The complexity of any given knowledge representation paradigm can be a use-inhibiting factor. When the content requirements of a knowledge-based system require a large population of authors, the knowledge representation paradigm must be easy to use so as to be accessible by a wide variety of experts. If a knowledge representation paradigm is too complex, more authorship skills are required, more training is required, and knowledge authorship is limited. However, when a knowledge representation is too simplistic, the ability for machine-assisted reasoning is severely limited. Computer aided decision support works best when the knowledge representation has enough structure for automated reasoning. As a result, a critical balance must be struck between simplicity of the knowledge representation that encourages wide authorship by experts, and the depth of representation necessary to make the knowledge usable by a knowledge reasoning system.

A more useful knowledge representation paradigm should have the ability to simulate the reasoning of a human being. For a given question, and a given problem, multiple answers and solutions are always possible. As a result, a reasoning system should have the ability to handle multiple answers to a question and to generate multiple conclusions. Furthermore, a knowledge representation paradigm should support flexible integration of knowledge agents. A knowledge agent is, commonly, a method by which a problem component, such as a question, or a task, is solved. Currently, knowledge representation paradigms are limited to the methods by which problem components are resolved.

A need exists, therefore, for an apparatus to address these concerns.

SUMMARY OF THE INVENTION

This invention is, in general, directed to an apparatus for a multi-modal reasoning ontology engine.

Thus, the invention may comprise an apparatus for a multi-modal reasoning ontology engine, comprising at least one computer readable medium; and a data structure embedded on the computer readable medium, comprising a knowledge representation fact base of knowledge objects compatible with reasoning systems requiring an evaluation of questions, comprising at least one task, and at least one result for a given one of the at least one task, wherein each of the results corresponds to a given one of the tasks to form a unique task-result pair.

Thus, the invention may further comprise an apparatus for a multi-modal reasoning ontology engine, comprising at least one computer readable medium; and a data structure embedded on the computer readable medium, comprising a knowledge representation fact base of knowledge objects compatible with reasoning systems requiring an evaluation of questions, comprising at least one task, and at least one result for a given one of the at least one task, wherein each of the results corresponds to a given one of the tasks to form a unique task-result pair; and a premise maintenance system of truth objects, wherein the truth objects are derived from the knowledge objects by a reasoning system, and the premise maintenance system infers knowledge from the knowledge objects.

BRIEF DESCRIPTION OF THE DRAWING

An embodiment of the invention is illustrated in the drawings in which.

DESCRIPTION OF PREFERRED EMBODIMENTS

Figure 1:
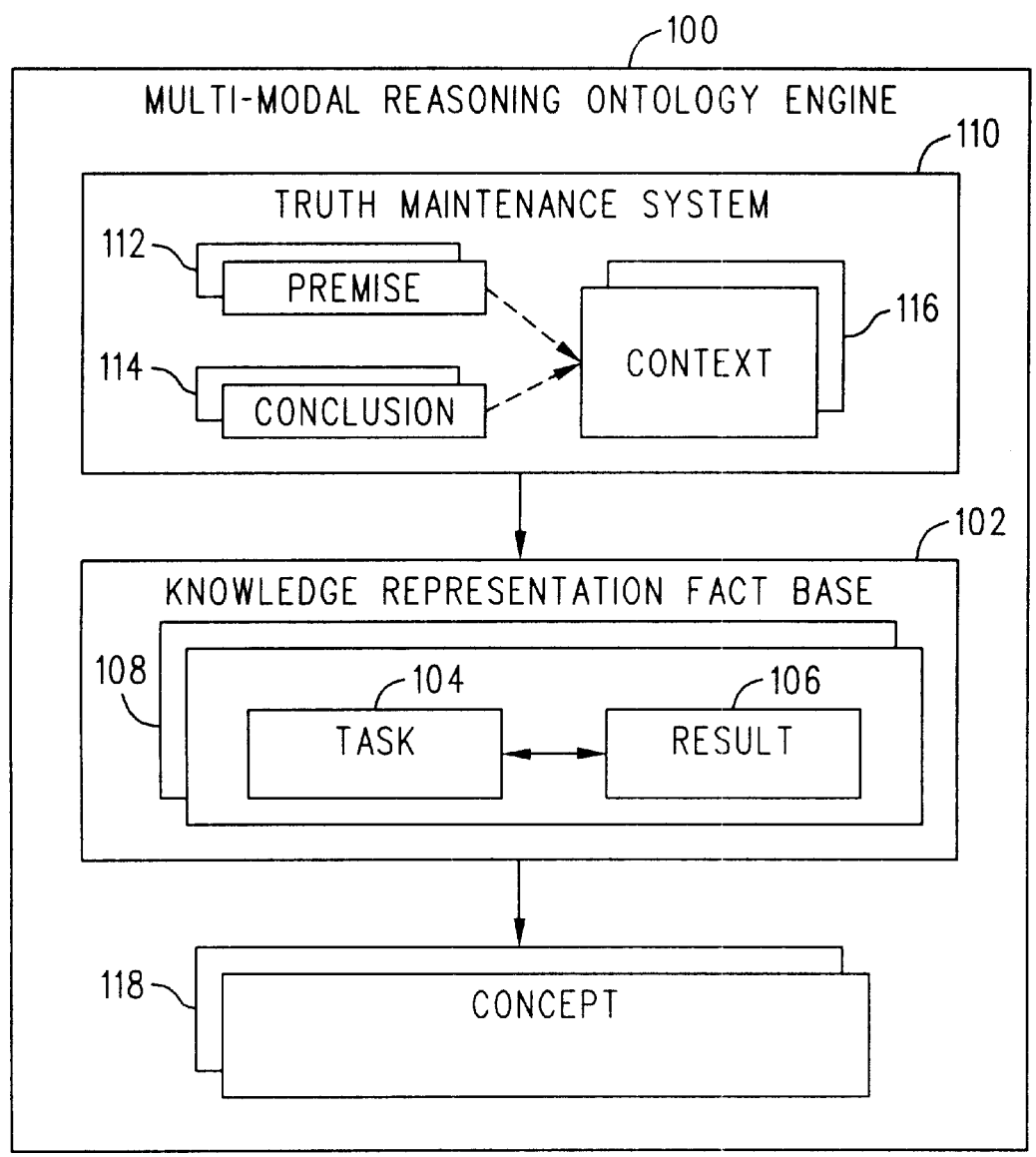
FIG. 1 illustrates an apparatus for a multi-modal reasoning ontology engine.

FIG. 1, in general, illustrates an apparatus for a multi-modal reasoning ontology engine 100. An ontology engine comprises a knowledge representation fact base 102 comprising knowledge objects called task objects 104 (tasks), and at least one result object 106 (results) for each task object, wherein each result object corresponds to a single task object that makes a unique task-result pair 108. An apparatus may further comprise concepts 118. Concepts allow knowledge objects to be categorized.

An apparatus for an ontology engine may further comprise a premise maintenance system 110 comprising truth objects called premises 112 and conclusions 114. (Although it is termed a premise maintenance system, a premise maintenance system comprises truth objects, which can be either premises and/or conclusions.) Premises and conclusions are reusable knowledge that are derived from knowledge objects by a reasoning system. Truth objects can be re-used in a decision support session, or a session in which a solution to a problem is sought. An apparatus may further comprise contexts 116. Contexts give the knowledge representation fact base another dimension so that knowledge objects can refer to more than one real world instance of the same type.

Tasks, results, premises, conclusions, contexts, and concepts are all accessible for use by external modules, such as reasoning systems, and are not locked in to any one reasoning system.

Introduction

Figure 2:
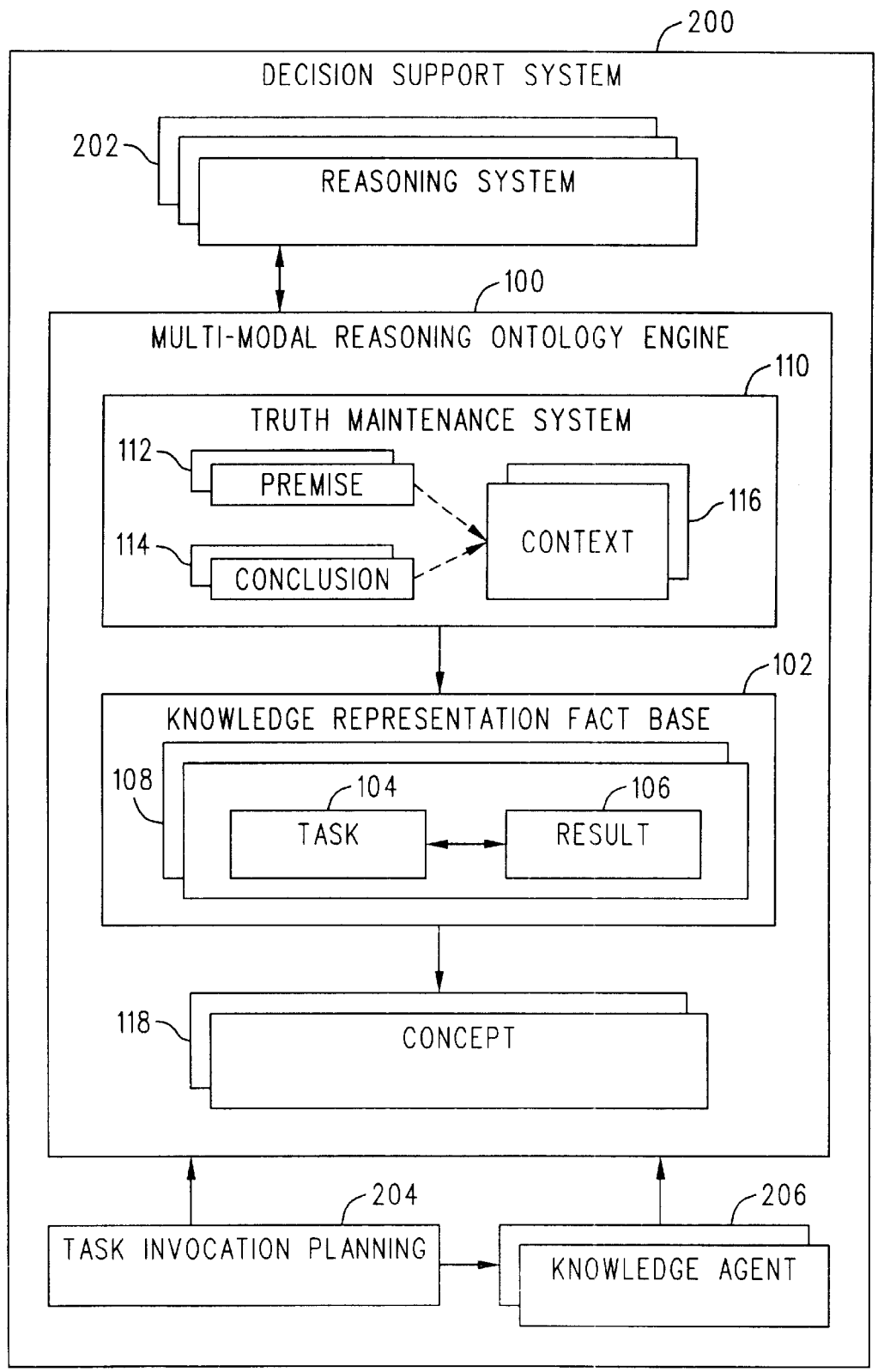
FIG. 2 illustrates an infrastrcture for a multi-modal reasoning ontology engine.

The infrastructure surrounding an ontology engine is illustrated in FIG. 2. A multi-modal ontology engine 100 operates within a decision support system 200 and can interact with one or more reasoning systems 202, a task planning component can interact with one or more reasoning systems 202, a task planning component 204, and one or more knowledge agents 206. Any reasoning system that provides logical requirements for obtaining an evaluation of questions which address a decision support problem is compatible with an ontology engine of the present invention. These include decision trees, decision graphs, incremental conclusions, default logic, and Bayesian belief networks. (A reasoning system based on incremental conclusions is the subject of the aforementioned co-pending patent application.)

During a decision support session, a reasoning system selects tasks from the ontology engine. A task invocation planning system surveys all appropriate knowledge agents that can be used to accomplish a given task, and then assigns the task to the most appropriate knowledge agent. The knowledge agent then evaluates all possible results for the current situation. If a task-result pair is an interrogative, it is evaluated. If an interrogative task-result pair passes, a premise is asserted as knowledge. The determination of whether a premise passes, and therefore, is asserted as knowledge, is made by a particular reasoning system. For example, a particular task-result pair may be set up to pass only if it evaluates as true, and for another task-result pair, it may be set-up to pass only if it evaluates as false. If a task-result pair is a declarative, a conclusion is asserted as knowledge. Premises and conclusions are maintained in a premise maintenance system.

A problem-solving method based on task modeling has been discussed in literature to describe a task-based approach to method selection and method configuration. This invention elaborates on previously described task models by including the notion of results, and by the way in which tasks, results, and task-result pairs are used by reasoning systems.

Knowledge Representation Fact Base

A knowledge representation fact base of knowledge objects comprises at least one task, at least one result for each task, wherein each result corresponds to a single task, a number of premises, and a number of conclusions.

Tasks and Results

At the heart of an ontology engine are tasks and results. Tasks and results form the basis for how premises are created and, ultimately, conclusions are determined. A task represents one activity in a series of activities that ultimately lead to one or more conclusions in a decision process. In a preferred embodiment, a task can take the form of an interrogative task (i.e., a question), or a declarative task (i.e., a statement). An interrogative task is the basis for forming a premise, and a declarative task is the basis for forming a conclusion. Each task has one or more results that characterize all possible outcomes of a task. A task can have an arbitrary cardinality of results. If all of the results for a given task are mutually exclusive, then the task can only have one result. If the results for a given task are not mutually exclusive, then the task can have multiple results. Every result is unique, and a given result corresponds to only one task, such that every task-result pair is unique. Results eliminate the need for certain tasks to be repetitively evaluated. In task-method mapping technologies, for example, it is necessary for tasks to be evaluated by a method before any conclusions can be reached. With results, however, opportunistic inferencing can be used to reach certain conclusions without the need to evaluate every task. This is discussed in more detail below.

Tasks for any given problem are predetermined by an expert. A result can be explicit (i.e., predetermined), or it can be solicited when a task is assigned (i.e., an interrogative task that queries for a surname will not have an explicit result). For example, in a decision support routine that examines the exposure of a Visual Basic program to the Y2K bug, the following are some of the task-result pairs that can be formed:

| Pair # | Task | Task Type | Result |
|---|---|---|---|
| 1 | What are the date types? | Interrogative | Visual Basic date type |
| 2 | What are the date types? | Interrogative | String |
| 3 | VB date variables unexamined for Y2K. | Declarative | Null |
| 4 | Y2K code for dates in strings need scrutiny. | Declarative | Null |
| 5 | What version is the VB program? | Interrogative | 1.0 |
| 6 | What version is the VB program? | Interrogative | 2.0 |
| 7 | What version is the VB program? | Interrogative | 3.0 |
| 8 | What version is the VB program? | Interrogative | 4.0 |
| 9 | What version is the VB program? | Interrogative | 5.0 |
| 10 | Date (1/00) = 2000 Date (1/50) = 2050 | Declarative | Null |
| 11 | Is the OLEAut32.DLL version >= 2.2? | Interrogative | Yes |
| 12 | Is the OLEAut32.DLL version >= 2.2? | Interrogative | No |
| 13 | Date (1/00) = 2000 Date (1/50) = 1950 | Declarative | Null |
| 14 | Date (1/00) = 1900 Date (1/50) = 1950 | Declarative | Null |

Each row represents a task-result pair. Note that while each task corresponds to at least one result, each result corresponds to only one task, resulting in a unique task-result pair. Each task is an interrogative (pairs 1, 2, 5–9, 11, 12) or a declarative (pairs 3, 4, 10, 13, 14). The declarative tasks are tasks which can conclude a particular decision process. Here, the declarative tasks dictate how a particular VB program's Y2K bug problem is to be resolved (i.e., by changing certain "1/00" dates to "2000"). These tasks are simply referred to as conclusions. Conclusions are implemented as declarative tasks in a preferred embodiment to reduce the number of objects in a knowledge representation fact base, thereby simplifying the expert authoring process.

These task-result pairs represent knowledge. However, this knowledge is not useful unless there is a logical connection between all the components. In other words, the conclusions stated above must be logically associated with a particular task-result pair in order for the conclusions to be appropriate. For instance, pair #13, which is a declarative task (conclusion), which makes a recommendation for a proper date conversion, would not have any logical connection to pair #5, which asks for the Visual Basic program version. In this example, pair #13 would logically correspond to pair #11. Although this is not obvious to a layperson, an expert in this area would recognize and encode this connection. This encoding is performed in a reasoning system. Furthermore, conclusions must be made by a process of deduction.

The distinction between a knowledge representation fact base and a reasoning system which operates on knowledge objects of the fact base, as allowed in this invention, enables complementary reasoning systems to operate on the same set of knowledge. This is referred to as multi-modal reasoning. This invention supports multi-modal reasoning because knowledge objects in the knowledge representation fact base can utilize other common infrastructures to collect the data (i.e., knowledge agents), or to present the data (i.e., reporting, web pages). Furthermore, it allows other reasoning systems which operate on the multi-modal reasoning ontology of the present invention to use other aspects of the multi-modal reasoning ontology engine. These other aspects of the multi-modal reasoning ontology engine include premises, conclusions, contexts, and concepts. These are all discussed in further detail below.

In an embodiment of this invention, task and result objects are specified in a relational database schema, such as Microsoft Access, Microsoft SQL-Server, informix, or Oracle. As illustrated below and in FIG. 3, each Task, identified by taskID, is mapped to a number of Results, identified by resultID. In this embodiment, each Task has a declareFlag field that characterizes the task as an interrogative or a declarative. Furthermore, each Task has a resultCardinality field which indicates the cardinality of results for that task. If resultCardinality is set to "1", then all possible results for the given task are mutually exclusive. If resultCardinality is set to "0", then the number of possible results is unlimited. If resultCardinality is set to "n", where n>1, then the number of possible results is n. Each Result has a resultType field that is set to one of three types. If resultType="SPECIFIC", then the result is the text that is coded in this field. If resultType="SOLICITONE",or resultType="SOLICITMANY" then the result is to be discovered by the system either by user text input, or by a knowledge agent implementing an appropriate method, the difference between the two result types being the cardinality of results.

| Field | Description |
|---|---|
| | Tasks |
| taskID | Unique number assigned by the database system for new tasks. |
| declareFlag | If set to TRUE, the task is declarative (conclusion. If set to FALSE, the task is an interrogative. |

-continued

| Field | Description |
|---|---|
| resultCardinality | If set to 1, results are mutually exclusive. If set to 0, there can be an unlimited number of results. If set to n, where n > 1, there can be n results. |
| | Results |
| resultID | Unique number assigned by the database system for new tasks. |
| taskID | Unique task to which this result is assigned. |
| resultType | If SPECIFIC, this result is enumerated. If SOLICITONE or SOLICITMANY it is supplied by a method. |

Figure 3:
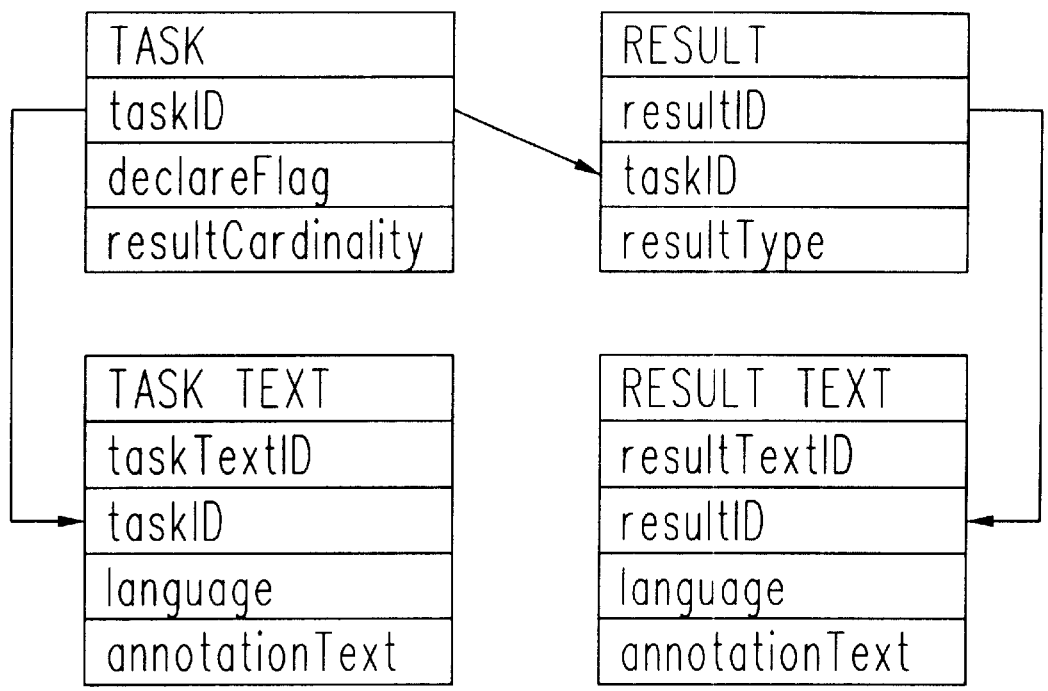
FIG. 3 illustrates the relationship between tasks and results in a knowledge representation fact base of a multi-modal reasoning ontology engine.

This relationship is illustrated in FIG. 3. The diagram shown in FIG. 3 also illustrates the functional flexibility of tasks and results. Because tasks and results are individual objects, features such as language selection and object annotation can be easily implemented. For example, tasks and results can be associated with one or more languages, allowing the ontology to be simultaneously represented in many languages in the same system. This would enable worldwide use and authoring reuse.

Concepts

An apparatus for an ontology engine may additionally comprise concepts, which allow tasks and results to be categorized. Concepts serve to categorize the kinds of services offered by a decision support system. For example, tasks in an incremental conclusions reasoning system, cases in a case-based reasoning system, branches of a decision tree reasoning system can be associated with one or more concepts. Each concept is an informal grouping of like ideas that provide a means for tasks and results to be categorized. These concept relationships are useful to knowledge authors to assist in locating reusable tasks and results. An author uses concepts to navigate and locate decision support tasks already existing in the database. The author may then extend the knowledge base with new task-result pairs that reuse the definition of a task in a different context. The decision support user would also benefit because the existence of a concept association with a task (or an interim conclusion) could help classify the state of the diagnosis thus far, focus the initial entry point for a decision support session, and assist in categorizing the results of a heuristic search that returns a list of possible tasks. Concepts can be hierarchically related to one another, lending to more powerful task and result categorization and tracking.

The tasks associated with a set of concepts are used to qualify specific decision support functions that most closely approach the selected concepts. Furthermore, the concept model can also be used to categorize aspects of a particular session that have not reached a satisfactory or useful conclusion so that a reasonable search of other knowledge bases can be joined. Concepts and their associated mechanisms also serve as the underlying data structure for other purposes needed by the decision support system. For example, it is also usable as a means to record manual or automatically generated indices for the task result objects, as well as to indicate an access control on task objects. In a preferred embodiment, concepts are associated with tasks using a relational database schema, as described above.

Premise Maintenance System

A premise maintenance system comprises truth objects called premises and conclusions. Truth objects are derived from knowledge objects that have undergone some form of processing. In the case of premises, interrogative task-result objects become premises when they are evaluated and pass, and declarative task-result objects become conclusions when they are selected through a deductive reasoning process.

The integrity of knowledge gained about a particular situation is maintained by premises. The core idea of a premise is a tuple consisting of a task, a result, and an evaluation of a given task-result pair in a user's environment. An appropriate knowledge agent (as determined by a common task invocation planning system) makes this evaluation. Depending upon the reasoning system, an evaluation can return a Boolean value, a probabilistic value, or a value of unknown. Some reasoning systems prefer a Boolean restriction. Others, like Bayesian networks, handle probabilities. Given a task, a task invocation planning system assigns the task to the most appropriate knowledge agent. The knowledge agent evaluates all the possible results for the given task, and returns those results that are true (or those results that have a predetermined probability) for the given situation to form one or more premises. A premise is established by a knowledge agent, for example, through direct measurement, inference, or by recording an interactive response from a human user. As discussed above, a conclusion is derived from the selection of a declarative task-result pair, where the selection is done through a process of deductive reasoning by a reasoning system.

Once knowledge is asserted, it can be maintained by a premise maintenance system. The primary function of the premise maintenance system is to provide reuse of discovered information at various points in the decision support process. This system preserves the effort of rediscovering existing information and supports the reuse of this information for one or more reasoning systems. The premise maintenance system also serves to maintain the integrity of knowledge within its context. It assigns contexts to knowledge (as determined by a controlling reasoning system), and tracks the knowledge relative to its context. If a context is removed, any knowledge that depends on the context is also retracted.

Figure 4:
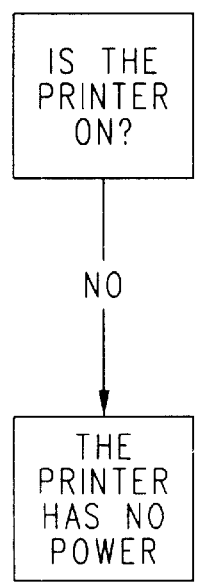
FIG. 4 illustrates an exemplary question-answer pair in a decision tree to be annotated by a multi-modal reasoning ontology engine.
Figure 5:
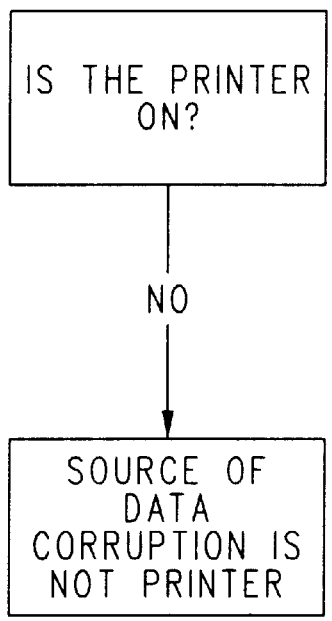
FIG. 5 illustrates another exemplary question-answer pair in a decision tree to be annotated by a multi-modal reasoning ontology engine.

A context represents a means to establish a restricted context that can circumscribe the validity of knowledge. A context is defined by a plurality of designated premises and/or conclusions. The choice of which premises and/or conclusions comprise a given context, and which premises and/or conclusions are asserted relative to that context is the responsibility of the reasoning system. Contexts allow the knowledge to exist many times in a decision support session, but within different contexts. The choice of which premises and/or conclusions comprise a given context, and which premises and/or conclusions are asserted relative to that context is the responsibility of a particular reasoning system. For example, a reasoning engine can designate that a particular evaluated question-answer/task-result pair is to operate as a premise in a certain context. For example, given the question-answer pair in the decision tree illustrated in FIG. 4, a reasoning system, which can be operating within the context of a Hewlett-Packard 4L laser printer, for example, can annotate this as a premise that operates within that context by maintaining it in the premise maintenance system. (This can be annotated in a way that is suitable to the language of the reasoning system.) If, in the course of analyzing another problem in the same decision support session (i.e., "Is the printer the source of the data corruption?"), where the session is operating within the context of an HP 4L LaserJet Printer, and where a question-answer pair in a series of questions calls for the determination of whether the printer is on, as in the example illustrated in FIG. 5, a premise maintenance system can be used to eliminate the rediscovery of this knowledge. For determining a solution to a problem, the question asks whether the printer is on. By using an application programming interface (API) to the ontology engine, any given reasoning system can discover whether this knowledge already exists. If it does exist, the knowledge can be obtained from the premise maintenance system without having to rediscover the knowledge. Furthermore, if allowed by the particular decision support session, a premise maintenance system also allows simultaneous exploration of a given decision path. By tracking knowledge by contexts, a decision support session seeking an answer to the question "Is the printer on" can simultaneously obtain an answer in the context of multiple printers.

A premise maintenance system also performs opportunistic inferencing over the results from any task. This inferencing is not limited to mutually exclusive results, as in many existing systems. Under common conditions, a premise maintenance system uses the state of one premise or conclusion (based on a particular result of a given task) to infer the state of other premises or conclusions (based on the other results of the same task). For example, if a task has n results, (cardinality=n), then a true assertion of one premise from one result automatically results in the premise maintenance system asserting n−1 premises of the remaining results as false. In general, in a task of n results, and i premises have been asserted true, a premise maintenance system can assert n−i premises as false. In other words, any result that is not true is false. The benefit of this limited inferencing is that non-exclusive results are possible without a knowledge agent having to explicitly nominate all results that do not hold for a given situation.

Knowledge may be retracted from a premise maintenance system due to a mistake, temporal changes, or other actions taken in the system. The premise maintenance system can retract knowledge by setting the status of a truth object to unknown, and removing the inferences made for other results of the same task.

A premise maintenance system can be programmatically implemented using any number of well-known methods. Knowledge in a premise maintenance system can be implemented as individual objects, or as methods upon an object representing a premise maintenance system.

Example Implementation

As discussed above, the ontology engine of the present invention is compatible with any reasoning system that provides logical requirements for obtaining an evaluation of questions which address a decision support problem. Such reasoning systems include decision trees, decision graphs, incremental conclusions, default logic, and Bayesian belief networks. (A reasoning system based on incremental conclusions is the subject of the aforementioned co-pending patent application.)

For example, a decision tree reasoning system operates on a series of question-and-answer tests. In a decision tree decision support system, a reasoning system evaluates a question. Depending on the answer to the question, the decision path for the particular problem can proceed in one of two directions. For example, given the question "IS THE PRINTER ON?", and the answers "THE PRINTER HAS NO POWER" and "THE PRINTER HAS POWER", the reasoning system in a decision tree decision support system determines how the knowledge will be discovered (i.e., by an externally designated knowledge agent, or a method internal to the system), and which answer is to be asserted for the knowledge returned. The logic for this troubleshooting strategy is authored by an expert using a hierarchy of IF-THEN-ELSE tests. These tests determine the relationship between the question-and-answer knowledge objects. For example:

1 CheckPrinter(PrinterName, Status)
2 IF Status=OFF, THEN return "THE PRINTER HAS NO POWER",
3 ELSE if Status=ON, THEN return "THE PRINTER HAS POWER".

Figure 6:
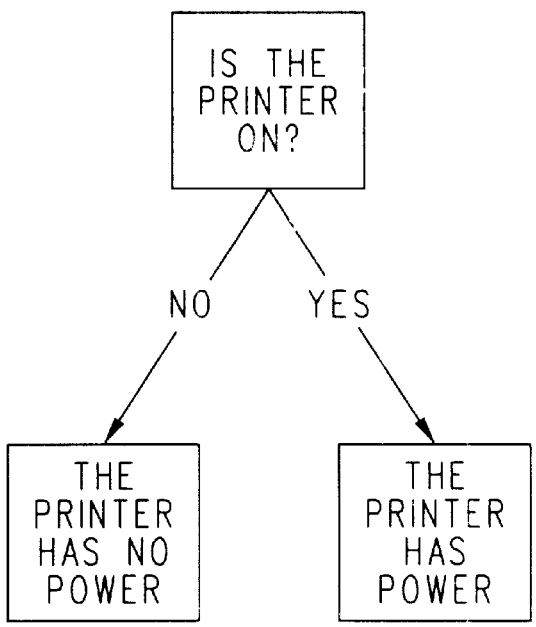
FIG. 6 illustrates an exemplary knowledge representation model of a multi-modal reasoning ontology engine.

In this code, a method CheckPrinter is used to determine the status, Status, of a printer called PrinterName. If the method returns Status=OFF, then the printer is not on, and connection between the question and one of two possible answers is established. If the method returns Status=ON, then the printer is on, and the connection between the question and the second of two possible answers is established. A knowledge representation model that makes the inferences between these objects is illustrated in FIG. 6. To utilize the multi-modal reasoning ontology engine of the present invention, these question-and-answer objects could be translated into any one of the following equivalent multi-modal reasoning ontology engine objects:

| TASK | RESULT | PREMISE | CONTEXT |
| --- | --- | --- | --- |
| Is the printer on? | YES | Is the printer on: YES | HP 4L Laser Jet |
| Is the printer on? | NO | Is the printer on: NO | HP 4L Laser Jet |
| Is the printer on? | YES | Is the printer on: YES | Epson 740 |
| Is the printer on? | NO | Is the printer on: NO | Epson 740 |
| The printer has: | POWER | The printer has: POWER | — |
| The printer has: | NO POWER | The printer has: NO POWER | — |

A reasoning system would obtain an answer to a given question by requesting one of the task-result-premise objects shown above. (A context object is also shown to distinguish between what otherwise look like duplicate task-result pairs.) Minor modifications could be made to a decision tree reasoning system so as to be compatible with an ontology engine of the present invention. For example:

1 GetTask(Question, Task)
2 CallKnowledgeAgent(Task, Result)

Lines 1 and 2 of the code represent an example of custom code that a reasoning system, such as a decision tree reasoning system, could implement to make use of the multi-modal reasoning ontology engine. The purpose of line 1 is to obtain the appropriate task for a given question. An API to the ontology engine would return a task that is best suited for the question. This could be accomplished by directly mapping a given question to a particular task, or by through a keyword search using concepts, discussed supra, for example. Method GetTask in this example returns Task, which is then mapped into CallKnowledgeAgent. Method CallKnowledgeAgent takes the given task and interfaces with an API to the ontology engine to obtain a result for the task. The ontology engine then decides how the task is performed, performs the task, and returns a result to method CallKnowledgeAgent.

A reasoning system can access discovered knowledge that is maintained in a premise maintenance system. As illustrated in the example above, if a question "Which printer is the source of the data corruption?" posed to the decision support system also calls for an answer to the question "Is the printer on" in the context of an HP 4L LaserJet printer, a premise maintenance system can be accessed to eliminate the rediscovery of the second task if the knowledge is available. Using an API to the ontology engine, a reasoning system such as a decision tree reasoning system could pass in a task and result parameter to the API. The API could then search the premise maintenance system for the availability of the premise. The API returns the result to the requesting reasoning system, which can then continue with its logic control flow using the results of the premise maintenance system for a particular question. The following pseudocode illustrates this:

1 GetTask(Question, Task)
2 If not CheckKnownPremise(Task, Result), Then CallKnowledgeAgent(Task, Result)

Finally, the ontology engine also asserts the evaluated task-result pair as a premise or a conclusion and maintains it in the premise maintenance system. (A task can comprise multiple results, but for purposes of this example, one result is returned). The result is returned to the reasoning system. The reasoning system can then use the discovered knowledge to make decisions in its same knowledge representation model.

3 IF Result=OFF, THEN Conclusion="THE PRINTER HAS NO POWER",
4 ELSE if Result=ON, THEN Conclusion="THE PRINTER HAS POWER".
5 AssertAsConclusion(Conclusion)
6 return(Conclusion)

Conclusion

A multi-modal reasoning ontology engine of the present invention solves a number of deficiencies seen in current knowledge representation paradigms. A multi-modal reasoning ontology engine makes knowledge reusable. In the Visual Basic Y2K bug example given in the description, the tasks and results can be used by other reasoning systems that require the evaluation of questions needed to solve a problem. Since these tasks and results can be generically used, multi-modal reasoning, or the ability for one or more reasoning systems to use the same knowledge representation fact base, is supported.

A multi-modal reasoning ontology engine also supports non-exclusive answers to a question, as well as multiple conclusions to a problem. Because a knowledge representation fact base has semantics that are closely tied to a reasoning system's algorithms in currently existing solutions, the task of inserting objects into a corresponding model is a complex one. Since the knowledge representation fact base of the multi-modal reasoning ontology engine is compartmentalized, the ability for a reasoning system to make inferences from any one knowledge object can be accomplished efficiently.

Knowledge authoring is a simplified process in a multi-modal reasoning ontology engine because an expert is only required to code tasks and results: conclusions are a form of tasks, and premises are generated by a reasoning system. Also, since tasks in the knowledge representation fact base of a multi-modal reasoning ontology engine can be mapped to any of several knowledge agents, these knowledge agents can be used by any participating reasoning system when the reasoning system makes use of the tasks. Lastly, a multi-modal reasoning ontology engine also makes it easier for long-term knowledge maintenance.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for a multi-modal reasoning ontology engine, comprising:
    a. at least one computer readable medium; and
    b. a data structure embedded on said at least one computer readable medium, said data structure comprising a knowledge representation fact base of knowledge objects compatible with reasoning systems requiring an evaluation of questions, said data structure comprising:
        i. at least one task; and
        ii. at least one result for a given one of said at least one task, wherein each of said at least one result corresponds to a different one of said at least one task to form a unique task-result pair.

2. An apparatus as in claim 1, additionally comprising a premise maintenance system of truth objects, wherein said truth objects are derived from said knowledge objects by a reasoning system.

3. An apparatus as in claim 2, wherein said truth objects comprise:
    a. a number of premises; and
    b. a number of conclusions.

4. An apparatus as in claim 3, wherein each of said number of premises is a task-result pair that is derived from an interrogative task and a corresponding result.

5. An apparatus as in claim 4, wherein each of said number of premises is said task-result pair that is pair that is evaluated.

6. An apparatus as in claim 4, wherein some of said number of premises is maintained in a premise maintenance system.

7. An apparatus as in claim 3, wherein each of said number of conclusions is a task-result pair that is derived from a declarative task and a corresponding result.

8. An apparatus as in claim 7, wherein each said number of conclusions is maintained in a premise maintenance system.

9. An apparatus as in claim 2, additionally comprising a number of contexts, wherein a number of truth objects are associated with said number of contexts.

10. An apparatus as in claim 9, wherein said context is determined by a reasoning system using said knowledge representation fact base.

11. An apparatus as in claim 9, wherein said context is maintained in a premise maintenance system.

12. An apparatus as in claim 1, additionally comprising a number of concepts, wherein at least one of said knowledge objects is associated with a given one of said number of concepts.

13. An apparatus as in claim 12, wherein a given one of said number of concepts is used to determine a number of said at least one task.

14. An apparatus as in claim 12, wherein a given one of said number of concepts is used to determine a number of said at least one result.

15. An apparatus as in claim 1, wherein said knowledge representation fact base is used by a reasoning system to generate knowledge.

16. An apparatus as in claim 15, wherein said knowledge comprises premises and conclusions.

17. An apparatus as in claim 1, wherein a number of said at least one task is associated with a knowledge agent.

18. An apparatus as in claim 1, wherein said at least one task and said at least one result is each associated with one or more languages.

19. An apparatus for a multi-modal reasoning ontology engine, comprising:
    a. at least one computer readable medium;
    b. a data structure embedded on said at least one computer readable medium, said data structure comprising a knowledge representation fact base of knowledge objects compatible with reasoning systems requiring an evaluation of questions, said data structure comprising:
        i. at least one task; and
        ii. at least one result, wherein each of said at least one result corresponds to a different one of at least one task to form a unique task-result pair; and
        iii. a premise maintenance system of truth objects, wherein:
            (1) said truth objects are derived from said knowledge objects by a reasoning system; and
            (2) said premise maintenance system infers knowledge from said knowledge objects.

20. An apparatus as in claim 19, additionally comprising a number of contexts, wherein a number of said truth objects are associated with said number of contexts.

* * * * *